June 8, 1965
J. A. MAZIARKA
3,187,859
HANDLE FOR CONTAINERS
Filed Jan. 17, 1962
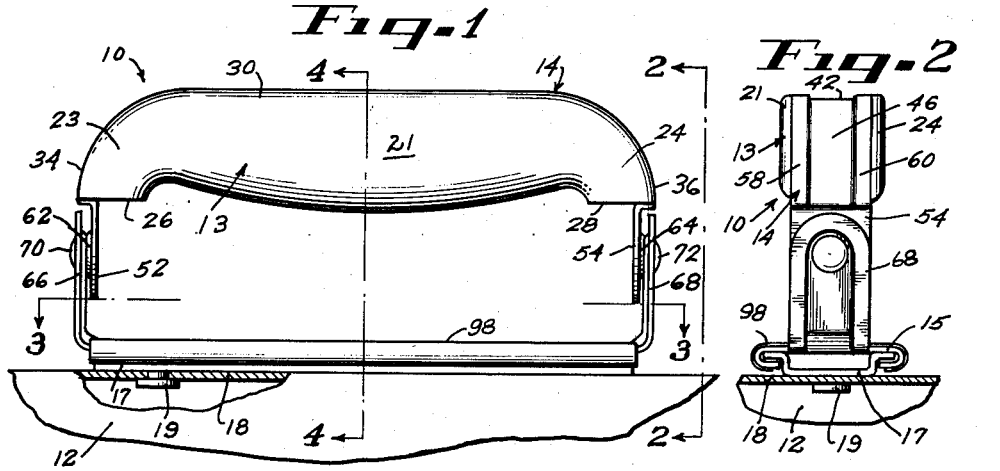
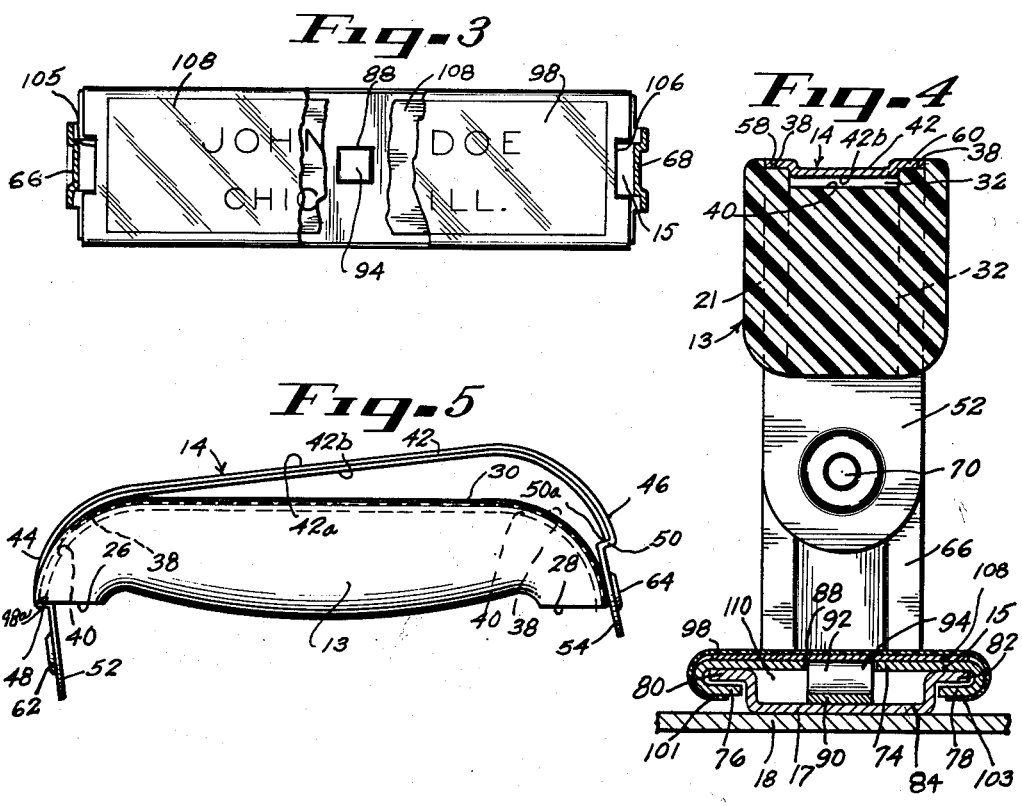
INVENTOR.
Joseph A. Maziarka
BY
Fidler, Beardsley & Bradley
ATTORNEYS

United States Patent Office 3,187,859
Patented June 8, 1965

3,187,859
HANDLE FOR CONTAINERS
Joseph A. Maziarka, 7706 N. Oketo, Niles, Ill.
Filed Jan. 17, 1962, Ser. No. 166,873
8 Claims. (Cl. 190—58)

This invention relates to handles for containers, such as suitcases, fishing tackle boxes, tool boxes and the like, and is more particularly directed to new and improved handles and methods of assembling such handles.

Heretofore difficulty has been encountered in the design and application of two-piece handle assemblies comprising a grip and a grip holding device which is secured or hingedly mounted on a lid or side of a container, such as a suitcase.

It was customary in the prior art to rivet, pin, screw or otherwise secure the grip to the holding device to form the handle assembly. Use of the prior art handle assemblies employing rivets, screws and the like to hold the grip to the grip holding device, tended to wear the handle assembly at the rivets or pins which would then work out of the assembly and become lost, thus requiring that the entire handle assembly be replaced. Moreover, if one of either the grip or the grip holding device became damaged, the entire handle assembly had to be replaced.

In my United States Patent No. 2,974,353, issued March 14, 1961, the disclosure of which is incorporated herein by reference, there is illustrated one form of a variety of applications with which the present invention is particularly suitable for use. My above-mentioned patent discloses a detachable handle assembly comprising a grip and grip holding device hingedly secured on a bar which is detachably locked, by a locking mechanism or latch member having a release device, to a base which is mounted on the lid or the side of a container, such as a suitcase. The release device of the locking mechanism extends through a slot in the bar to lock the handle to the base and to limit translation of the handle grip and holding device and is depressible to release the detachable handle. When depressed, the release device will release the bar and permit removal of the handle assembly from the base. However, the release and locking mechanism were exposed to the deleterious effects of weathering, such as rain, which would pass through the slot in the bar through which the release device extended. The results of such exposure to rain on the release mechanism, constructed of metal, would be a gradual corrosion of the release mechanism, and eventually, inoperativeness of the release mechanism.

With the present invention, the problems and difficulties of the prior art are substantially overcome by the provision of a handle assembly having a grip removably secured to a grip holding device without the aid or use of pins, rivets or screws and by the provision of a removable sheet material, which may be transparent, and which protects the locking mechanism and release device of the locking mechanism from exposure to the effects of weather.

It is, therefore, an object of the present invention to provide a handle assembly for containers, such as suitcases, including a grip removably secured to a grip holding device.

It is another object of the present invention to provide a handling assembly for containers, such as suitcases and the like, including a removable grip which is secured to a holding device without employment of securing screws, pins, rivets and the like.

Still another object of the present invention is to provide a handle assembly for containers, such as suitcases and the like, which includes a removable grip held by a grip holding device.

A further object of the present invention is to provide a handle assembly for containers, such as suitcases and the like, having a removable grip.

A still further object of the present invention is to provide a handle assembly for containers, such as suitcases and the like, which includes a removable grip held in interengagement therewith by a holding device which is detachably secured to a base mounted on a lid or side of said container.

Another object of the present invention is to provide a detachable handle assembly for containers, such as suitcases and the like, which includes a handle assembly locking mechanism and release device which are substantially protected against the effects of weathering by a removable sheet covering of plastic material which is of sufficient flexibility to permit use of the release device to detach the handle assembly for the container, without removal of the sheet covering, by pressure applied to the release device by depression of the plastic sheet.

Still another object of the present invention is to provide a handle assembly for containers, such as suitcases and the like, which includes a handle assembly release device for removal of the handle assembly for the container and which is protected from the effects of weathering by a removable plastic sheet covering.

These and other objects, features, and advantages of the present invention will become readily apparent to those skilled in the art from a careful consideration of the following detailed description, when considered in conjunction with the accompanying drawings illustrating an embodiment of the present invention, wherein like reference numerals and characters refer to like and corresponding parts throughout the several views, and wherein:

FIG. 1 is a fragmentary view in side elevation of a handle assembly constructed in accordance with the present invention which is detachably mounted on a container;

FIG. 2 is an end view partially broken away and taken along line 2—2 of FIG. 1;

FIG. 3 is a view taken along line 3—3 of FIG. 1 illustrating the handle release device and protective covering therefor of the handle embodiment of FIG. 1;

FIG. 4 is a view taken along line 4—4 of FIG. 1; and

FIG. 5 is a view in side elevation illustrating the manner of securing the handle grip to the grip holding device to form the handle assembly of FIG. 1.

Although the present invention has a variety of applications, a suitable environment therefor is illustrated in FIG. 1 wherein a handle assembly, constructed in accordance with the principles of the present invention and generally indicated by the numeral 10, is secured to a bar 15, which is detachably connected to a base 17 mounted to a wall 18 carried by a container 12, such as a suitcase.

The handle assembly 10 is of two-piece construction and comprises a pre-formed molded or laminated grip 113 which is constructed of suitable material, such as plastic, and a grip holding device 14 which is interengagably linked with the grip 13.

The holding device 14 is secured to or hingedly mounted to a horizontal bar 15 (FIG. 2). The bar 15 may be integral with, or, as shown in the drawings, detachably connected to a base member 17 mounted as by rivets 19 to the suitcase 12.

The grip 13 comprises a pre-contoured body 21 having an outer surface 30 and opposed depending arcuate end members 23 and 24, each of which terminates in a generally flat end surface, surfaces 26 and 28 respectively. The end surfaces 26 and 28 are preferably coplanar and each extend substantially parallel to the outer surface 30 of the grip body 21. The outer surface 30 of the body 21 and the outer surfaces 34 and 36 of end members 23 and 24 are provided with a continuous and generally stepped channel 32 (FIG. 4). The channel 32 comprises a stepped recess which extends longitudinally along the length of the outer surface 30 of the body 21 and continuously along the adjacent outer surfaces 34 and 36 of the end members 23 and 24 to provide a pair of first seats 38 (FIG. 4) and a second inner seat 40, each of which extends around the outer surface of the grip 10 and terminates adjacent the shoulder surfaces 26 and 28.

The grip holding device 14 is constructed of a suitable material, such as spring steel having a predetermined degree of resiliency. The one-piece holding device 14, in general, has an inner surface contour conforming to the corresponding adjacent outer surface contour of the grip body 13 and comprises a body 42 having a pair of arcuate end members 44 and 46 (FIG. 5).

Each of the end members 44 and 46 has an inturned portion, portions 48 and 50, respectively, each of which extend inwardly and generally parallel to the body 42. The upper surfaces 48a and 50a of the inturned portions 48 and 50, respectively, form a land or shoulder, as clearly appears in FIGS. 1 and 5.

A pair of flanges 52 and 54 which are substantially perpendicular to the upper surface 42a of the body 42 are provided for the purpose of hingedly mounting the handle assembly 10 to corresponding flanges carried by the bar 15 as described hereinafter.

The body portion 42 and arcuate end members 44 and 46 of the holding device 14 have marginal raised and outturned end flanges 58 and 60 (FIG. 4), which are provided to correspondingly bottom on the seats 38 of the channel 32 of the grip 13 when assembled therewith. When assembled with the grip 13, inner surface 42b of the body 42 bottoms on the channel seat 40 in a manner to be described more fully hereinafter. The end flanges 52 and 54 of the holding device 14 are bored and each is provided with a bearing boss 62 and 64 which bears against the upright end flanges 66 and 68 of the bar 15 to permit pivotal movement of the holding device 14 relative to the bar 15. The end flanges 66 and 68 of the bar 15 are complementary bored and hinge pins 70 and 72 hingedly secure the end flanges 52 and 54 of the handle assembly 10 to the end flanges 66 and 68 of the bar 15.

The general construction of the bar 15 is described in my Patent No. 2,974,353 and, in addition to the end flanges 66 and 68 extending substantially perpendicular to an oblong strip of rigid metallic material which defines a central body 74 (FIG. 4), includes a pair of inturned flanges 76 and 78, the latter being in spaced relation with the adjacent outer face of the suitcase wall 18. When assembled with the base 17, the inturned flanges 76 and 78 of the bar 15 accommodate and interengage complementary out-turned flanges 80 and 82 which are carried by the body 84 of the base 17. The base 17, as aforesaid, is mounted, as by rivets 19, to the wall 18 to the suitcase 12.

Substantially at a central point the body 74 of the bar 15 is provided at its transverse center with a slot 88 (FIGS. 3 and 4). The base 17 carried a resilient oblong latch member 90 such as disclosed in my above mentioned patent, which has formed integral therewith a raised locking mechanism 92 which includes a release device 94 adapted to seat in the slot 88 in the bar 15 to lock the bar 15 and handle assembly 10 in fixed position with respect to the suitcase 12.

To engage the handle assembly 10 with the base 17, the bar 15 is placed in a longitudinal relation with the base 17. The flanges 80 and 82 of the base 17 will enter the spaces between the body 74 of the bar 15 and the flanges 76 and 78 thereof when the handle bar 15 is pushed towards the opposite end of the base 17. The release device 94 by the bar 15 is depressed and rides against the under surface of the body 74 of the bar 15 until it is aligned with the slot 88 formed in the bar 15. Then the release device 94 raises and enters the slot 88 to lock the handle assembly 10 and the bar 15 to the base 17.

To detach the handle assembly 10 and the bar 15 from the base 17, the release device or latch 94 is depressed in a downward direction and the bar 15 moved in a longitudinal direction after the release device or latch 94 clears the slot 88.

A feature of the present invention resides in the method of assembling the grip 13 to the grip holding device 14 to form the handle assembly 10. The holding device, as aforesaid, is constructed of spring steel and by spreading the end flanges 52 and 54 outwardly or by spreading one of the flanges 52 or 54 outwardly, as appears in FIG. 5. the grip 13 may be readily assembled to the holding device 14 to form the handle assembly without the aid or use of screws, rivets or pins.

After spreading one or both of the flanges 52 and 54 outwardly to accommodate the grip 13, one end surface, for example, end surface 26 of grip 13, is seated against the shoulder 48a provided by the inturned portion 48 of the grip holding device 14, as appears in FIG. 5. The grip 13 then is pivoted vertically upward on shoulder 48a to seat the opposite end surface 28 of the grip 13 against the shoulder 50a of the inturned portion 50 of the holding device 14 whereupon the flanges 58 and 60 of the grip holding device 14 bottom against the shoulders 38 of the grip 13 and the body 42 of the grip holding device 14 is aligned with and preferably bottomed against the surface 40 of the grip channel 32. The flanges 58 and 60 of the grip holding device, when so bottomed, are coplanar to the top surface 30 of the grip 13 and present an attractive appearance. The resiliently yieldable spread flanges 52 and 54, or either of these flanges, are then returned to their, or its, normally unloaded condition after the grip 13 is so aligned with the holding device.

After the tension on the spread flanges 52 and 54 is released and the flanges returned to their normally unloaded condition, shown in FIG. 1, the inturned portions 48 and 50 of the grip holding device engage the surfaces 26 and 28 of the grip and cooperate with the flanges 58 and 60 of the grip holding device 14 to interlock or clamp the grip 13 with the holding device 14 without the necessity for use of screws or pins.

Thus, with the present invention a replaceable grip may be detachably clamped or interlocked firmly in engagement with a grip holding device without the requirement for securing rivets, screws and the like. Should the grip 13 become unusable or damaged for any reason, the grip may be replaced by the simple expedient of spreading one or both of the resiliently yieldable flanges 52 and 54 of the grip holding device 14 outwardly and by removing the old grip from engagement therewith and replacing a new grip in the manner above described.

Another feature of the present invention resides in the employment of a protective sheet of plastic material 98 (FIG. 3) which is preferably flexible and provided with inturned flanges 101 and 103 (FIG. 4) which are wrapped around the flanges 76 and 78 of the bar 15 to holding the sheet material 98 to the bar 15. The sheet 98, as appears in FIG. 3, is provided with recesses 105 and 106 to accommodate the arcuate portions of the body 74 of the bar 15 (FIG. 1) which connect the body 74 with the flanges 66 and 68. The cooperative engagement of the shoulders defined by the recesses 105 and 106 of the sheet material 98 and arcuate portions of the body 74 of the bar 15 limit translation of the sheet 98 in a plurality of directions.

The sheet 98 should be of sufficient flexibility to permit its removal from the bar 15 and may be transparent. If the sheet 98 is transparent, a name plate or card 108 may be trapped between the sheet 98 and the upper surface of the bar 15.

It will be observed that the sheet 98 spans the slot 88 through which the release device 94 of the locking mechanism 90 extends and protects the release device 94 and locking mechanism 90 from the effects of weathering, such as rain which would otherwise directly impinge on the release device 94, and which would form and flow in a stream through the slot 88 into the space 110 (FIG. 4) defined by the bar 15 and base 17 in which the locking mechanism 90 is located. The sheet 98 should also be of sufficient flexibility to permit depression thereof adjacent the release device 94 to permit depression of the release device by a user so that the detachable handle assembly may be removed from the suitcase without the necessity of removal of the plastic sheet 98 from its position spanning the slot 88 and the release device 94.

Although various minor modifications of the present invention will become readily apparent to those versed in the art, it should be understood that I wish to encompass within the scope of the patent warranted hereon all such embodiments as reasonably and properly come within the scope of my contribution to the art.

I claim:

1. A handle assembly for a container such as a suitcase and the like comprising a grip unit including a resilient grip holding device, a grip removably clamped by said holding device, and latch device engaging means for detachably connecting the grip unit to a grip latching unit; a grip latching unit including means for permanently securing the grip latching device to a container, a depressible latch device for reengagement with said latch device engaging means to detachably connect said grip unit to said container, a cover carried by said grip unit for masking said latch device when said latch device is in engagement with said latch device engaging means, said cover being sufficiently flexible for flexing thereof to depress said latch device to thereby permit detachment of said grip unit from said grip latching unit, whereby flexing of said cover and depressing said grip latching device permits detachment of said grip unit from said grip latching unit without requiring removal of said masking cover from said grip unit or removal of said grip latching unit from said container.

2. The handle assembly of claim 1 wherein said masking cover comprises: a sheet of material having a flexibility sufficient to permit depression thereof and of said latch device to permit detachment of said handle assembly from said container.

3. The handle assembly of claim 2 wherein said sheet is formed of a plastic material.

4. The handle assembly of claim 2 wherein said sheet is formed of a transparent plastic material.

5. A handle assembly for a container such as a suitcase and the like, comprising a grip holding device having an inverted U-shaped body portion provided with a pair of end flanges extending inwardly towards each other, each of said inturned flanges of said grip holding device carrying a depending arm extending downwardly for attachment to a container, said body portion having a longitudinal open-end channel extending between said flanges, said channel in cross section having a bottom wall, upstanding spaced side walls with each of said side walls having an outturned flange, and an inverted U-shaped grip having a stepped recess formed inwardly of the sides of the grip and in the outer surface thereof for receiving the channel and outturned flanges of the grip holding device when assembled therewith, the ends of said grip being seatable on said inturned flanges providing the only means for holding said grip in engagement with said grip holding device, and said body portion adjacent at least one of said inturned flanges being resiliently yieldable when urged by a predetermined force to permit assembly and disassembly of said grip and said holding device.

6. The grip holding device of claim 5 wherein each end of said body portion adjacent said flanges is resiliently yieldable to permit assembly and disassembly of said grip and said grip holding device.

7. The grip holding device of claim 5 wherein said grip holding device is a pre-formed plate of resilient material.

8. A handle assembly for a container, such as a suitcase and the like, comprising a depressible latch mechanism for detaching the handle assembly from said container, and a removable masking member covering said latch mechanism of sufficient resiliency to permit depression of said latch mechanism for detachment of said handle assembly without removal of said masking member from its position covering said latch mechanism.

References Cited by the Examiner
UNITED STATES PATENTS

| | | | |
|---|---|---|---|
| 1,427,608 | 8/22 | Lotz | 190—58.1 |
| 1,777,015 | 9/30 | Person | 24—230 |
| 1,957,141 | 5/34 | Jordan | 24—230 |
| 2,537,750 | 1/51 | Gretschel | 190—58.1 |
| 2,564,012 | 8/51 | Jordan | 70—455 |
| 2,800,984 | 7/57 | Burtchaell | 190—57 |
| 2,974,353 | 3/61 | Maziarka | 16—114 |

GEORGE O. RALSTON, *Primary Examiner.*

DONALD R. SCHRAN, FRANKLIN T. GARRETT,
*Examiners.*